United States Patent [19]

Beaulieu et al.

[11] Patent Number: 4,774,548
[45] Date of Patent: Sep. 27, 1988

[54] PHOTOGRAPHIC PRINTER INCLUDING INTEGRAL REFLECTION DENSITOMETRY APPARATUS

[75] Inventors: Dennis N. Beaulieu, Churchville; Edward P. Goll, Wayland, both of N.Y.

[73] Assignee: Eastman Kodak Company, Rochester, N.Y.

[21] Appl. No.: 62,304

[22] Filed: Jun. 12, 1987

[51] Int. Cl.$^4$ ............................................. G03B 27/80
[52] U.S. Cl. ......................................... 355/38; 355/68
[58] Field of Search ................... 355/32, 35, 36, 67, 355/68, 38

[56] References Cited

U.S. PATENT DOCUMENTS

| | | | |
|---|---|---|---|
| 2,529,975 | 11/1950 | Smith | 355/38 |
| 3,462,221 | 8/1969 | Tajima et al. | 355/77 |
| 3,469,915 | 9/1969 | Thaddey | 355/38 |
| 3,832,070 | 8/1974 | Cox | 356/209 |
| 4,264,196 | 4/1981 | von Stein et al. | 355/41 |
| 4,274,732 | 6/1981 | Thurm et al. | 355/38 |
| 4,335,956 | 6/1982 | Findeis et al. | 355/27 |
| 4,464,045 | 8/1984 | Findeis et al. | 355/38 |
| 4,526,462 | 7/1985 | Hope et al. | 355/38 |
| 4,540,276 | 9/1985 | Ost | 355/38 |
| 4,577,961 | 3/1986 | Terashita | 355/77 |
| 4,623,246 | 11/1986 | Kubota et al. | 355/38 |

Primary Examiner—Monroe H. Hayes
Attorney, Agent, or Firm—Jeffrey L. Brandt

[57] ABSTRACT

A photographic printer is provided including reflection densitometry apparatus for measuring the reflective density of a reflective patch or print. The apparatus includes a carrier separable from the printer for supporting a plurality of reflective patches. A light sensor is disposed on the printer, and means are disposed on the printer for supporting the carrier with a selected one of the reflective patches opposing the light sensor. Means are provided for illuminating the reflective patch, and means are provided for focusing the light reflected off of the reflective patch onto the light sensor. Further provided are means for selectively positioning at least one transmissive filter between the selected reflective patch and the light sensor.

15 Claims, 5 Drawing Sheets

FIG. I

PHOTOGRAPHIC PRINTER INCLUDING INTEGRAL REFLECTION DENSITOMETRY APPARATUS

REFERENCE TO RELATED APPLICATIONS

This application is related to copending applications Ser. Nos. 062,522, 062,306, and 062,523 filed concurrently herewith.

BACKGROUND OF THE INVENTION

The subject invention relates generally to photographic printers and more specifically to photographic printers including apparatus for measuring the reflective density of reflective patches.

In the course of printing photographic negatives and developing the corresponding prints it is often desirable to measure the reflective density of photographic prints and/or reflective test patches. To control a photographic paper processor, for example, it is often necessary to measure the reflective density of a strip of reflective patches of known exposure, i.e. the paper processor control strip. To analyze the performance of a photographic printer, it is often desirable to measure the reflective density of selected photographic prints made with that printer.

U.S. Pat. No. 4,526,462 to Hope et al. shows a photographic printer including a print test probe connected to a microprocessor and activated by a user to measure the light reflected off of a print. The microprocessor is subsequently used to calculate the reflective density of the print. Hope et al. suffers, however, from the disadvantage of requiring manual positioning of the probe by an operator for each measurement. Further, the patent does not appear to show any automatic positioning of the filters necessary to perform the reflective densitometry measurements. Presumably, the positioning of such filters will require manual intervention by the operator.

U.S. Pat. No. 3,462,221 to Tajima et al. shows a photographic printer and processor including a light sensor positioned to measure the light reflected off of processed prints. The light sensor is connected to a control device, which is subsequently used to control the printing process and processing conditions. Tajima et al., however, suffers from the disadvantage that it is only capable of measuring the reflective density of the paper present in the processor, and does not provide the ability to measure, for example, an externally provided film process control strip. Further, the patent teaches only the measuring of black and white prints, and does not make any provisions for measuring the reflective density of color prints or reflective patches.

OBJECTS OF THE INVENTION

The principal object of the present invention is to provide in a photographic printer a convenient, economical, efficient, and accurate apparatus for measuring reflective densities.

Another object of the present invention is to provide in a photographic printer an apparatus for measuring reflective densities which requires a minimum of operation by a human operator.

A further object of the present invention is to provide in a photographic printer apparatus for measuring reflective densities wherein appropriate illumination and filtering is provided automatically in response to the introduction of the reflective patch or print into the printer.

Another object of the present invention is to provide in a photographic printer apparatus for measuring reflective densities including a calibration patch for calibrating the operation of the apparatus at the beginning of each operation.

Yet another object of the present invention is to provide in a photographic printer an apparatus for measuring reflective densities which is particularly well suited for measuring the reflective densities of paper process control test strips and printer control test prints.

SUMMARY OF THE INVENTION

A new and improved photographic printer is provided including apparatus for measuring the reflective density of a reflective patch (or print). The printer includes means for introducing the reflective patch thereinto. Means are provided, responsive to said introducing means, for automatically measuring the reflective density of the reflective patch.

In a preferred embodiment of the present invention, a carrier, separable from the printer, is provided for holding one or more reflective patches. The carrier includes a calibration patch of constant reflective density for use in calibrating the reflective density means. Means are provided for supporting the carrier on the printer. A light sensor is situated in a fixed location on the printer. Means responsive to the introduction of the carrier into the supporting means are provided for illuminating a selected one of the reflective patches, and for focusing the light reflected from the selected patch onto the light sensor. Means are provided for selectively introducing a transmissive filter between the selected reflective patch and the light sensor, and a computer is provided responsive to the output of the light sensor for calculating the reflective density of the reflective patch.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DETAILED DESCRIPTION OF THE INVENTION

Figure 1:
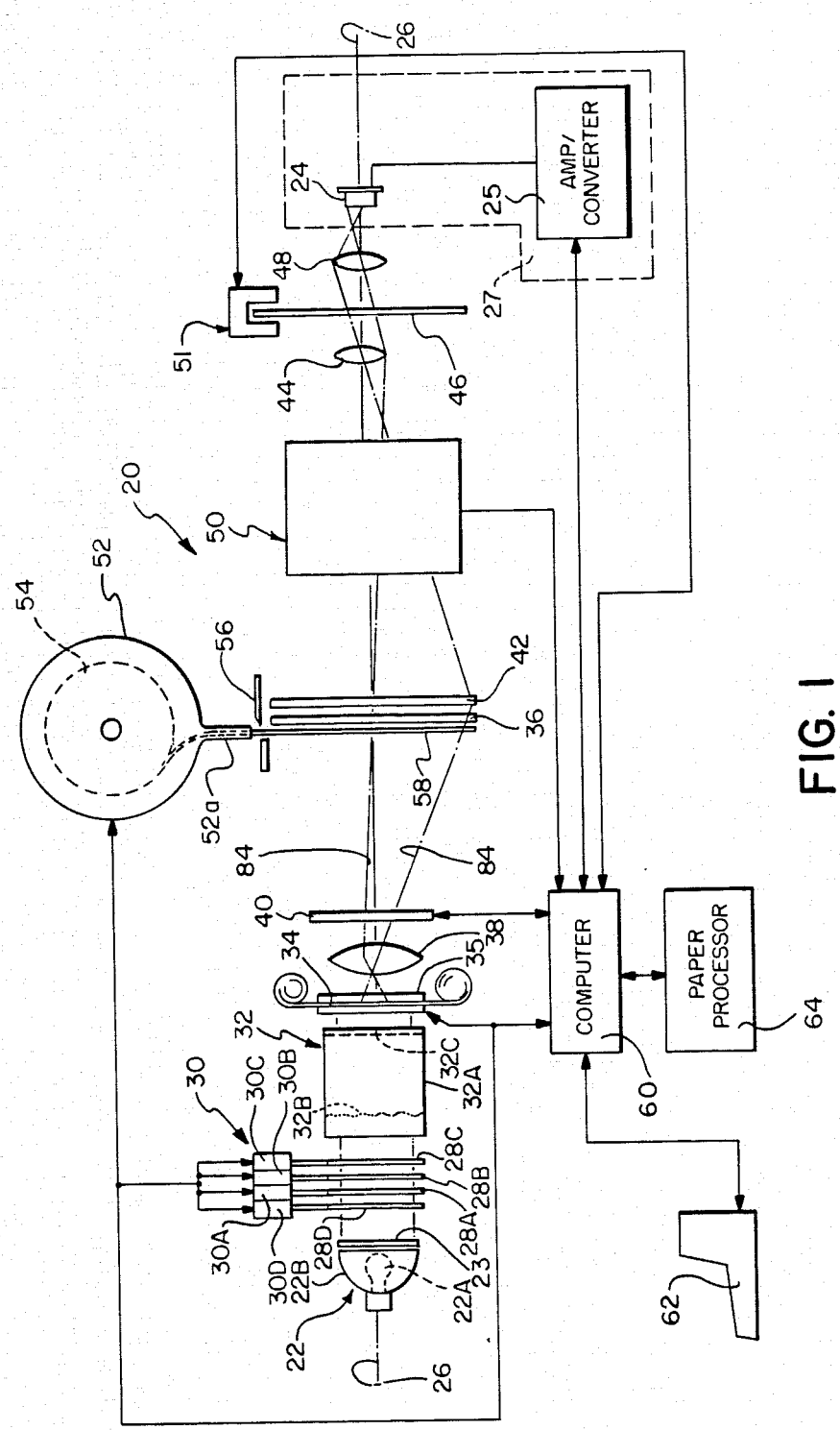
FIG. 1 shows a schematic view of a color photographic printer constructed in accordance with the present invention.

Referring now to FIG. 1, a color photographic printer 20 includes a light source 22 and photodiode 24, both situated on a common optical axis 26. Light source 22 is directed so as to project light along axis 26 towards photodiode 24. Light source 22 comprises, for example, a tungsten-halogen lamp 22A incorporating a "cold-mirror" reflector 22B, and also a heat absorbing glass plate 23. Photodiode 24 comprises, for example, a blue-enhanced silicon diode. An amplifier/converter unit 25 (described in detail below) is connected to the output of photodiode 24, the two forming a photometer 27.

Adjacent light source 22 are three subtractive light filters, a Cyan filter 28A, a Magenta filter 28B, and a Yellow filter 28C. A colored balance filter, in this embodiment of the invention a red-yellow balance filter 28D, is disposed between Cyan filter 28A and light source 22. Each filter 28A-28D is connected to a filter control mechanism 30, the filter control mechanism comprising a separate rotary solenoid connected to each filter. The rotary solenoids are indicated at 30A-30D in correspondence with the filters 28A-28D. Filter control mechanism 30 operates to selectively dispose filters 28A-28C into the light path along axis 26 to stop exposure of their respective colors. Filter control mechanism 30 further operates, in a manner described in further detail hereinbelow, to selectively dispose filter 28D out of the light path along axis 26 when scanning a negative, and into the light path when exposing/printing a negative.

Adjacent filter 28C and centered on axis 26 is a light integrating box (LIB) 32. LIB 32 comprises, for example, a reflecting box 32A having a light-reflecting interior, including pyramid glass 32B at a first end proximate light source 22, and a diffuser 32C at the opposing second end. Situated adjacent LIB 32 between light source 22 and photodiode 24 is a film negative 34 to be printed. Negative 34 typically comprises one of a roll or disk of negatives, such as 135 or 110 type photographic negatives, and is supported in an appropriate holder and advance mechanism 35. As used herein, the term "negative" includes all transparent film images, including photographic transparencies.

Situated between film negative 34 and photodiode 24, in a plane of focus perpendicular to and substantially centered on axis 26, is an optically transparent paper platen 36 comprised, for example, of an optically clear glass. A projection lens 38 and dark shutter 40 are disposed, respectively, between negative 34 and paper platen 36. Disposed adjacent platen 36, between the platen and photodiode 24, is a field lens 42. Field lens 42 preferably comprises a fresnel lens, chosen for its substantially flat, thin dimensions. Adjacent field lens 42, between the field lens and photodiode 24, is a reflection densitometry assembly 50 (described in detail below). Situated between reflection densitometry assembly 50 and photodiode 24 are, respectively, a relay lens 44, a rotating scanning disc 46, and a condensing lens 48. A position sensing mechanism 51 is positioned adjacent the edge of scanning disc 46.

Disposed proximate one end of platen 36 is a roll-paper dispensing mechanism 52 containing a roll 54 of unexposed photographic paper. Proximate an outlet 52A of roll-paper dispensing mechanism 52 is a cutting mechanism 56, such as a blade. In FIG. 1, printer 20 is shown with a portion 58 of unexposed photographic paper 54 dispensed from roll-paper dispensing mechanism 52 so as to overlay platen 36 with the light-sensitive side facing negative 34.

It will be understood that the various lenses including projection lens 38, field lens 42, relay lens 44, and condensing lens 48 comprise lenses of standard design selected to provide appropriate focal lengths and f-stops (apertures).

A digital computer 60 is provided for controlling printer 20 and for interacting with a human user (not shown) via a keyboard and display unit 62. Computer 60 is connected to photometer 27 via amplifier/converter unit 25. Computer 60 is further connected to filter controller 30, roll-paper dispensing mechanism 52, reflection densitometer apparatus 50, film holder and advance mechanism 35, dark shutter 40, position sensing mechanism 51, and a paper processor 64.

Figure 2:
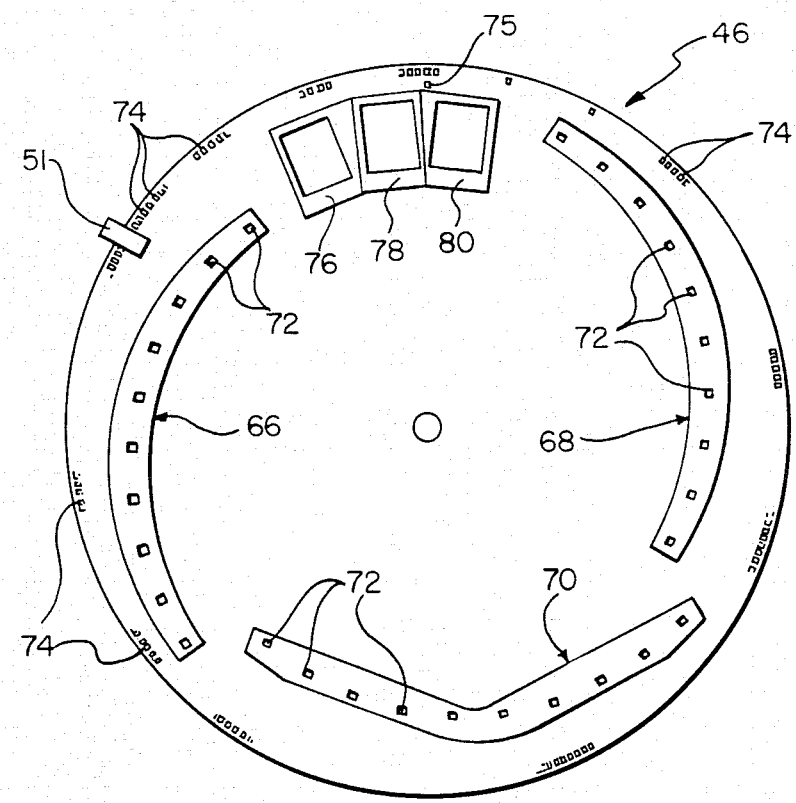
FIG. 2 shows a front view of the scanning disc of FIG. 1.

Referring now to FIG. 2, scanning disc 46 comprises an improvement to what is typically referred to in the art as a Nipkow disc. In accordance with the known features of a Nipkow disc, scanning disc 46 includes three spirally disposed rows of scanning filters including a set of Red scanning filters 66, a set of Blue scanning filters 68, and a set of Green scanning filters 70. Each set of filters 66, 68, 70 includes ten small apertures 72, each aperture being overlaid with an appropriately colored filter. Filters 66, 68, 70 each preferably comprises a broad-band filter so as to provide adequate light to photodiode 24 when measuring scanned densities as described in detail below. Further in accordance with the known features of a Nipkow disc, scanning disc 46 includes a plurality of timing marks 74 and a single starting mark 75 disposed about its periphery. In a manner described in detail below, timing marks 74 and starting mark 75 are used to determine the relative position of the various apertures on scanning disc 46 with respect to optical axis 26, and to communicate this information to computer 60 via position sensing mechanism 51.

In accordance with the improvements of the present invention, scanning disc 46 further includes Red, Green, and Blue large area transmissive (LAT) filters, indicated at 76, 78 and 80, respectively. Each LAT filter 76, 78, 80 comprises an aperture relatively larger than aperture 72 overlain by an appropriately colored filter. LAT filters 76, 78, 80 each preferably comprises a narrow-band filter for providing the desired precision when performing LATD measurements as will be described in detail below. LAT filters 76, 78 and 80 are positioned relative to timing marks 74 and position mark 75 so that their position relative to axis 26 can be determined by computer 60.

Figure 2A:
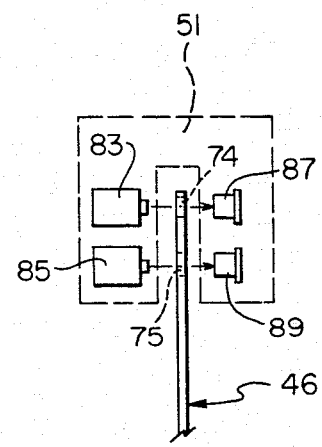
FIG. 2A shows a schematic view of the position sensing mechanism of FIG. 1.

Referring now to FIG. 2A, position sensing mechanism 51 comprises a pair of light-emitting diodes (LED's) 83, 85, situated on a first side of scanning disc 46 and positioned to project light through timing marks 74 and starting mark 75 of the scanning disc, respectively. Positioned on the opposite side of scanning disc 46 are a pair of photodiodes 87, 89. Photodiodes 87, 89 are located so as to oppose LED's 83, 85, respectively. Hence, photodiodes 87, 89 sense the position of scanning disc 46 by monitoring the rotation of timing marks 74 and starting mark 75, respectively.

Figure 3:
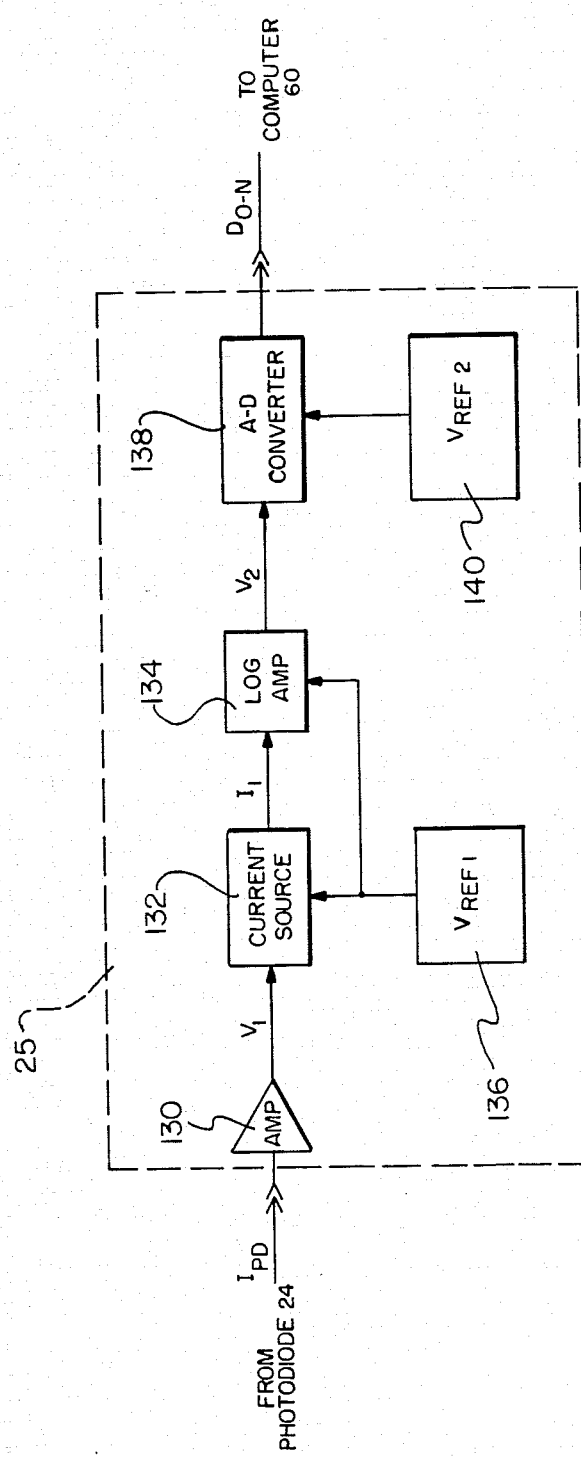
FIG. 3 shows a schematic diagram of AMP/CONVERTER 25 of FIG. 1.

Referring now to FIG. 3, an exemplary embodiment of amplifier/converter unit 25 is shown for converting a current $I_{pd}$ output by photodiode 24 to a digital output code $D_{O-N}$ for processing by computer 60. It will be understood that the exact structure of photometer 64 does not constitute a portion of the present invention, and thus the implementation of such circuits is not treated exhaustively herein. Amplifier/converter unit 25 includes a high gain current-to-voltage converter 130 connected to a temperature compensated, precision current source 132. The output of current source 132 is connected to a logarithmic amplifier (log amp) 134, the current source and log amp both being supplied with a reference voltage $V_{ref1}$ by a reference voltage generator 136. The output of log amp 134 is connected to a 10-bit A/D converter 138, the A/D converter being supplied a reference voltage $V_{ref2}$ by a second reference voltage generator 140. The 10-bit digital word output $D_{O-N}$ of A/D converter 138 is connected to computer 60.

In operation, picoamp-level current $I_{pd}$ is converted to an amplified voltage $V_1$, which is in turn converted to a nanoamp-level current $I_1$ by current source 132. Current $I_1$ is converted to an amplified log voltage $V_2$ by log amp 134. Log voltage $V_2$ is subsequently converted to a 10 bit digital word $D_{O-N}$ by A/D converter 138, which is read and stored by computer 60 as described below. Reference voltage generators 136 and 138 are used to calibrate current source 132, log amp 134, and A/D converter 140. Photometer 27 exhibits an operating range of approximately three decades.

In accordance with the present invention, printer 20 operates in three basic modes to provide the capabilities of: (1) measuring the LATD and/or scanned densities of negatives, and printing those negatives according to their measured transmission characteristics; (2) measuring the LATD of transmissive test patches; and (3) measuring the large area reflective density (LARD) of reflective test patches. All measurements and printing are performed on optical axis 26 using single photodiode 24. For purposes of explanation, these modes of operation will be described separately below.

In the preferred embodiment of the invention, the first mode of operation described immediately above is performed using the scanned densities of the negatives, and will thus be referred to herein as the 'scan and print' mode of operation. In the scan and print mode of operation, negative 34 is loaded into holder and advance mechanism 35. With no paper on platen 36, and with filters 28A, 28B, 28C, and 28D all removed from the light path along optical axis 26, light source 22 projects light along axis 26 towards photodiode 24. This projected light, illustrated by dashed-line rays 84, is diffused by LIB 32 so as to impinge uniformly on negative 34. Dark shutter 40 is opened to pass light, and the light projected through negative 34 is focused by projection lens 38 onto glass platen 36. Because no paper is on platen 36, the light passes through the platen and is focused by field lens 42 onto relay lens 44. In this scan and print mode of operation, reflection densitometer apparatus 50 is transparent to this projected light. Scanning disc 46 is rotated by a motor (not shown). Relay lens 44 focuses the projected light through a medial region of scanning disc 46 towards condensing lens 48. Relay lens 44 and scan disc 46 are aligned such that all of the filters on the scan disc pass through the light output of the relay lens. As scan disc 46 rotates, each of scanning filters 66, 68, 70 will scan substantially the entirety of the projection of negative 34, while large area transmission filters 76, 78, 80 each will intercept substantially the entirety of the projection. The portions of the light filtered by the various filters on scanning disc 46 are subsequently focused by condensing lens 48 onto photodiode 24.

As a first step in the process of scanning and printing negative 34, computer 60 controls the scanning of the negative by R, G, and B scanning filters 66, 68 and 70, respectively, on scanning disc 46. This scanning is performed by storing the output of photometer 27 in computer 60 as the various apertures 72 in the scanning filters 66, 68, 70 pass preselected regions of the light projected through negative 34. Computer 60 controls the scanning by monitoring the position of timing marks 74 and starting mark 75 using position sensing mechanism 51. The location of the various filters on scanning disc 46 being known relative to timing marks 74 and starting mark 75, computer 60 uses this information to calculate when a selected window 72 of a scanning filter 66, 68, 70 is aligned with a selected region of negative 34. Computer 60 then stores the output of photometer 27 at the calculated time. It will be appreciated that in this manner substantially the entirety of negative 34 can be scanned in as many discrete units as is desired, the only limitation being the physical limitations of the equipment. The scanned transmissive densities of negative 34 thus obtained are stored in a memory (not shown) of computer 60 for subsequent use in determining exposure times for the negative.

At this point in the process of printing negative 34, computer 60 has scanned and stored the transmissive density of the negative at a plurality of locations. For example, and without limitation, it may be desired to utilize scanning disc 46 in the manner described above to scan 80 discrete units of negative 34 to determine the R, G, and B density of each of these units. Using these scanned transmissive density measurements, computer 60 now calculates an appropriate exposure time for printing negative 34 onto the portion 58 of unexposed photographic paper 54 which will be advanced to overlay platen 36 in the manner described below. It will be understood that one of many known algorithms can be utilized to calculate the printing exposure time. Such algorithms can include, for example, the use of a printing density conversion matrix in computer 60 as a first step in calculating exposure times in a manner well known to those skilled in the art. The selection of an appropriate algorithm is not a part of the present invention, and will not be discussed in detail herein.

Subsequent to the conclusion of the scanning step, and after the initiation of the exposure calculations, dark shutter 40 is closed. The light projected by light source 22 is stopped by dark shutter 40, and roll-paper dispensing mechanism 52 is actuated by computer 60 to unroll unexposed paper portion 58 onto platen 36.

With the light-sensitive side of paper portion 58 directed at negative 34, solenoid 30D of filter control mechanism 30 is used to position red-yellow balancing filter 28D on axis 26, and then dark shutter 40 is opened to pass light. Cyan, magenta, and yellow filters 28A, 28B, 28C, are manipulated by corresponding solenoids 30A–30C of controller 30 to expose negative 34 onto paper portion 58 in accordance with the results of the exposure algorithm calculation done by computer 60. Upon proper exposure of paper portion 58, dark shutter 40 is closed. Cutting mechanism 56 is then activated to separate now exposed paper portion 58 from roll 54, and the paper portion is subsequently removed for development by paper processor 64 (the details of which are not shown herein). Filters 28A–28D are reset off of optical axis 26 out of the light path. The scan and print process described above is then repeated for subsequent negatives 34.

In the second mode of operation described above, i.e. measuring the LATD of negative 34 (or a transmissive test patch substituted therefore) the negative is placed in holder and advance mechanism 35, and paper portion 58 is removed from (or not advanced onto) platen 36. Computer 60 then reads and stores the output of photometer 27 as LAT filters 76, 78 and 80 are respectively disposed in the light path along axis 26. In a manner similar to the scanning operation described above, computer 60 controls these measurements by monitoring timing marks 74 and starting mark 75 via position sensing mechanism 51. The measured R, G and B LATD's of negative 34 are stored in the memory of computer 60.

It is to be understood that, in the preferred embodiment of the invention, LATD's are only used to measure the transmissive density of transmissive test patches, for example to control a film processor (not shown). Scanned transmissive densities are used, in the manner described above, to calculate exposure times for pictorial negatives. However, LATD's can be used to calculate the exposure times for pictorial negatives. Similarly, some combination of LATD's and scanned densities can be also used to calculate the exposure times for pictorial negatives, the densities used being dependent on the types of negatives being printed and the exposure calculation algorithm implemented in computer 60. The scope of the present invention is thus intended to cover all of these density measurement/exposure calculation combinations.

Figure 4:
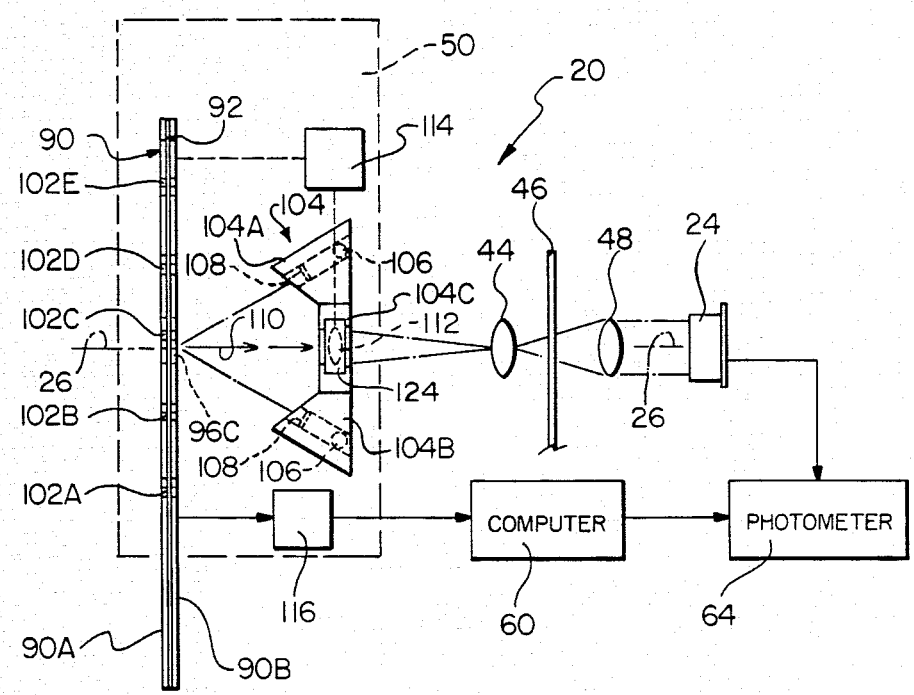
FIG. 4 shows a top view, partially in schematic, of a portion of FIG. 1 including details of the reflection densitometry apparatus of FIG. 1.
Figure 5:
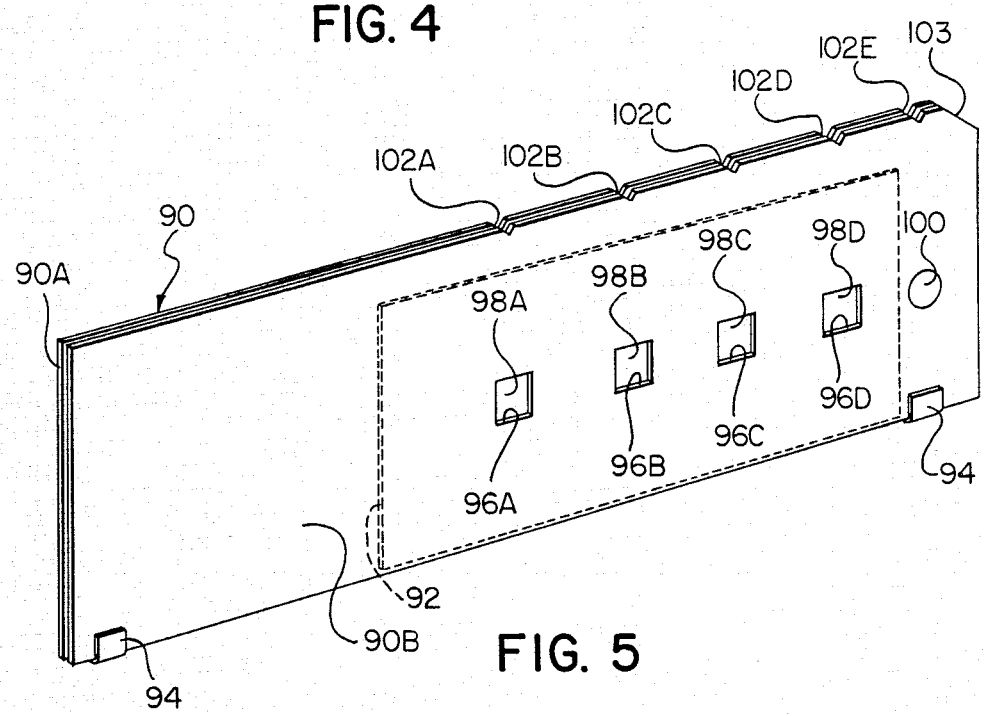
FIG. 5 shows a perspective view of the carrier of FIG. 4.

Referring now to FIGS. 4 and 5, a portion of printer 20 is shown including details of reflection densitometer apparatus 50. Apparatus 50 includes a removable carrier 90 (best shown in FIG. 5) for supporting a paper strip 92. Carrier 90 comprises two generally rectangular halves 90A, 90B hinged along a lower, length-wise edge by hinges 94 so that they can be opened to accept strip 92. Four rectangular apertures 96A, 96B, 96C, and 96D are disposed in side 90B of carrier 90, these apertures being generally rectangular in shape and in vertical alignment within the carrier side.

For purposes of explanation, paper strip 92 will be described herein as a paper process control strip including four developed, reflective patches 98A, 98B, 98C, and 98D. Patches 98A-98D vary in density from white patch 98D to black patch 98A, each of the patches having a known exposure. Patches 98A-D are located on test strip 92 so as to be in respective alignment with apertures 96A-D of carrier 90. Carrier 90 further includes a white calibration patch 100 of constant density, disposed permanently on the outer surface of side 90B thereof in vertical alignment with apertures 96A-D. Five V-shaped detents are provided along the unhinged, lengthwise edge of carrier 90, these detents being indicated at 102A, 102B, 102C, 102D, and 102E. Detents 102A-102D are in vertical alignment with apertures 96A-D, respectively. Detent 102E is in vertical alignment with calibration patch 100. An upper corner 103 of carrier 90 is chamfered to engage a roller in a manner described below.

Referring back to FIG. 4, it is seen that carrier 90 is supported in printer 10 so as to be disposed in a plane perpendicular to axis 26. Carrier apertures 96A-D, and hence strip patches 98A-D and calibration patch 100, face photodiode 24. A generally U-shaped bracket 104, including a pair of legs 104A, 104B connected by a common base 104C, is disposed between carrier 90 and photodiode 24. Bracket 104 is disposed symmetrically about axis 26, with legs 104A and 104B disposed on opposite sides of the axis and projecting towards carrier 90. Each leg 104A and 104B supports a lamp 106 in a reflective tube 108. Optionally included in each reflective tube 108 is a heat absorbing glass 109 including infrared-rejecting interference filters. Each reflective tube 108 functions as an integrating box to direct the light output of the lamp. Each lamp 106 and tube 108 are directed to project light, indicated by rays 110, at the aperture of carrier 90 centered on axis 26; i.e. aperture 96C as shown in FIG. 4.

Figure 6:
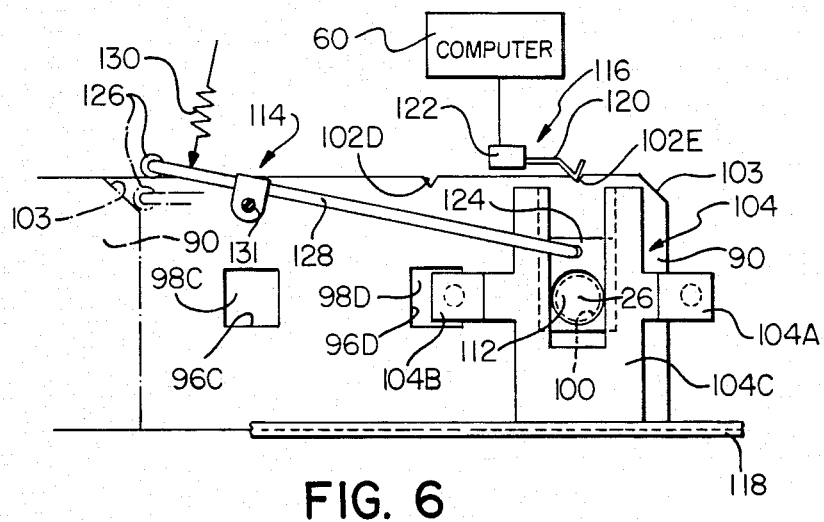
FIG. 6 shows a back view, partially in schematic of the reflection densitometry apparatus of FIG. 4.

Continuing to describe apparatus 50 as shown in FIG. 4, a movable supplementary lens 112 is shown situated in base 104C of bracket 104. A lens control mechanism 114, details of which are described below with respect to FIG. 6, is connected to lens 112 and further connected so as to sense the presence of carrier 90 in printer 20. A position sensing mechanism 116, the details of which are also described with respect to FIG. 6 below, is disposed so as to sense detents 102A-E of carrier 90 as the carrier is inserted into printer 20.

Referring now to FIG. 6, printer 20 includes a slot 118 for accepting carrier 90 and supporting the carrier in the plane perpendicular to axis 26. Position sensing mechanism 116 is seen to comprise a spring portion 120 shaped and positioned to engage each respective detent 102A-E, one at a time, as carrier 90 is inserted into printer 20. Spring portion 120 is connected to a pressure sensitive switch 122 which electronically senses the movement of the spring portion through detents 102A-E and transmits this information to computer 60.

Lens control mechanism 114 includes a holder 124 for lens 112, the holder being connected to a roller 126 via a pivoting member 128. A spring 130 normally biases pivoting member 128 in a counter-clockwise direction about a pivot point 131. With member 128 thus biased, holder 124 is normally biased towards the top (as viewed in FIG. 6) of bracket base 104C such that lens 112 is removed from the optical path along axis 26. When carrier 90 is inserted into slot 118, roller 126 engages chamfered corner 103 of the carrier, and pivoting member 128 pivots, thereby sliding lens 112 into a centered position in the optical path along axis 26. In FIG. 6, reflection densitometry apparatus 50 is shown in solid line with carrier 90 inserted in printer 20 such that patch 100 and lens 112 are both centered on optical axis 26. Further shown, in dashed-line, is the engagement of roller 126 with chamfered corner 103 of carrier 90.

As described above, in the scan-and print and LATD measurement modes of operation, carrier 90 is removed from printer 20, lens 112 is automatically removed from the optical path along axis 26, lamps 106 are off, and reflection densitometry apparatus 50 is effectively transparent to the printer. When it is desired to measure the large area reflective density of patches 96A-D of paper strip 92, the paper strip is inserted in carrier 90, and the carrier is inserted in slot 118 of printer 20. Position sensing mechanism 116 senses the insertion of carrier 90 into printer 20 and signals computer 60. Under the control of computer 60, lamps 106 are switched on. Roller 126 engages carrier 90 and pivoting member 128 pivots to position lens 112 on axis 26.

As position sensor 116 senses each respective detent 102A-E, computer 60 controls the measurement of the large area reflective density of the corresponding paper strip patch 96A-D or the calibration patch 100 aligned along axis 26. For purposes of explanation, the operation of printer 20 in the large area reflection densitometry mode of operation will now be described with respect to FIG. 4, wherein detent 102C is aligned with axis 26 and paper strip patch 96C is centered about the axis. Light rays 110 projected by lamps 106 are directed by reflective tubes 108 through aperture 96C onto paper strip patch 98C, and reflected therefrom into lens 112. Supplementary lens 112 forms a virtual image of paper strip patch 96C in the plane of fresnel lens 42 for relay lens 44, which in turn focuses this image onto rotating scanning disc 46 in the manner described above. The apertures in disc 46 for the filters 76, 78, 80 act as optical field stops to reduce stray light from reaching photodiode 24 so that only light reflected from patch 92C is measured. The light projected through filters 76, 78, 80 on scanning disc 46 is focused by condensing lens 48 onto photodiode 24. Computer 60 then measures the light detected by photodiode 24 when LAT filters 76, 78, and 80 (FIG. 2) are aligned, respectively, on axis 26. It will thus be appreciated that LAT filters 76, 78, 80 are used to measure the LATD of negative 34 (as described above), or the large area reflective density of the reflective test patches 96A–D on paper strip 92. The timing of this process is controlled by computer 60, using position sensing mechanism 51 in the manner described above.

Thus, as carrier 90 is inserted into printer 20 (from left to right as viewed in FIG. 6), reflection densitometry apparatus 50 of the printer is used to measure the large area reflective density of white calibration patch 100, and paper strip patches 96D, 96C, 96B, and 96A, in that order. When the large area reflective densitometry measurements are complete, carrier 90 is removed from printer 20, and, under the control of computer 60, reflection densitometry apparatus 50 becomes essentially invisible to the printer. If, for example, paper strip 92 comprises a paper process control strip, the large area reflective densities measured during the above-described reflection densitometry mode of operation would then be compared to previously measured large area reflection reference densities and limits stored in computer 60. The invention is not thus limited, however, and the reflection densitometry capability provided by printer 20 can be used, for example, to measure the LATD of printer control test prints, or to make any other appropriate reflection densitometry measurements.

Figure 7:
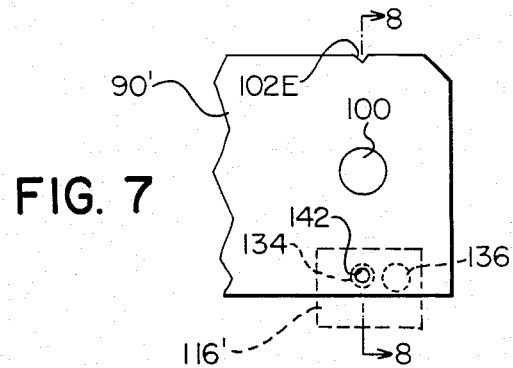
FIG. 7 shows an alternate embodiment of position sensing mechanism 116 of FIG. 6.
Figure 8:
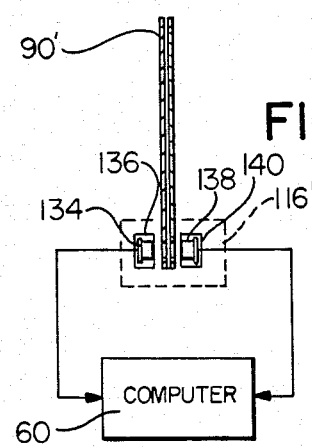
FIG. 8 is a sectional view of FIG. 7 taken along line 8—8.

FIGS. 7 and 8 show an alternate embodiment of position sensing mechanism 116' wherein a pair of LED's 134, 136 and opposing photosensors 138, 140, respectively, are used to sense position holes 142 in carrier 90'. LED's 134, 136, and photosensors 138, 140, are fixed on printer 20 on opposite sides of slot 118 (FIG. 6) A separate position hole 142 is positioned on carrier 90' in fixed relation to patch 100 and each aperture 96A–96D. Detents 102A–102E are still used to position carrier 90' in printer 20. However, computer 60 senses the position of carrier 90' by monitoring photosensors 138, 140. Specifically, when carrier 90' is inserted into printer 20, the carrier will block the light path between LED 136 and photosensor 140, turning the photosensor off. As carrier 90' is advanced into printer 20, LED 134 and photosensor 138 will together sense each hole 142 as patch 100 and apertures 96A–96E are positioned, sequentially, to perform large area reflection densitometry measurements in the manner described above.

There is thus provided a photographic printer including integral apparatus for measuring the reflective density of photographic prints and/or other types of reflective test patches. The apparatus economically shares some of the hardware, such as the photometer and the control computer, otherwise necessary to make prints. The apparatus provides for substantially automatic measurement, including illumination and filtering, responsive to the introduction of the reflective patch into the printer.

While a preferred embodiment of the invention has been illustrated and described, it will be clear that the invention is not so limited. Numerous modifications, changes, variations, substitutions and equivalents will occur to those skilled in the are without departing from the spirit and scope of the present invention.

What is claimed is:

1. A photographic printer including reflection densitometry apparatus comprising:
   a light sensor positioned at a selected location on said printer;
   a carrier separable from said printer for supporting at least one reflective patch;
   means disposed on said printer for supporting said carrier on said printer; and
   means responsive to the introduction of said carrier into said supporting means for illuminating said reflective patch and for focusing the light reflected off of said reflective patch onto said light sensor so as to measure the reflective density of said reflective patch.

2. The apparatus of claim 1 and further including means for positioning at least one filter between said reflective patch and said light sensor.

3. The apparatus of claim 2 wherein said at least one filter comprises one each red, green, and blue large area transmissive filters.

4. The apparatus of claim 1 wherein said measuring means includes a computer responsive to the output of said light sensor for calculating the reflective density of said reflective patch.

5. The apparatus of claim 9 wherein said carrier includes a calibration patch of constant reflective density for calibrating said reflection densitometry apparatus.

6. A photographic printer including reflection densitometry apparatus comprising:
   a light sensor positioned on an optical axis;
   a carrier separable from said printer for supporting a plurality of reflective patches, said carrier including a calibration patch of constant reflective density;
   means disposed on said printer for supporting said carrier on said printer with a selected one of said reflective patches or said calibration patch substantially centered on and in a plane generally perpendicular to said optical axis;
   means responsive to the introduction of said carrier into said supporting means for illuminating said selected patch;
   means responsive to the introduction of said carrier into said supporting means for focusing the light reflected off of said selected patch onto said light sensor; and
   means for selectively positioning at least one transmissive filter between said selected patch and said light sensor.

7. The apparatus of claim 6 wherein said carrier comprises a plurality of windows disposed substantially in coplanar relationship with said calibration patch for displaying a corresponding plurality of reflective test patches.

8. The apparatus of claim 6 and further including means cooperating with said carrier for determining which of said plurality of reflective patches or said calibration patch is selected to be substantially centered on said optical axis.

9. The apparatus of claim 6 wherein said illuminating means includes a pair of lamps disposed on opposite sides of said optical axis and positioned so as to illuminate said selected patch.

10. The apparatus of claim 9 wherein said illuminating means further includes means responsive to the introduction of said carrier into said supporting means for actuating said pair of lamps.

11. The apparatus of claim 10 wherein said actuating means comprises:
   means for sensing the introduction of said carrier into said supporting means;
   a computer connected between said sensing means and said lamps.

12. The apparatus of claim 6 wherein said focusing means comprises:
   a movable supplementary lens; and
   means responsive to the introduction of said carrier into said supporting means for centering said movable lens substantially on said optical axis between said reflective patch and said light sensor.

13. The apparatus of claim 6 wherein said positioning means comprises means for selectively positioning at least one each red, green and blue transmissive filters between said reflective patch and said light sensor.

14. The apparatus of claim 6 wherein said positioning means comprises a rotating disc supporting said transmissive filter.

15. A photographic printer including reflection densitometry apparatus comprising:
   a light sensor disposed on an optical axis;
   an elongate carrier including a plurality of aligned coplanar windows for displaying a like plurality of reflective patches and a calibration patch of constant reflective density;
   means disposed on said printer for supporting said carrier with a selected one of said reflective patches or said calibration patch in a plane generally perpendicular to and substantially centered on said optical axis;
   means, including a pair of lamps disposed on generally opposite sides of said optical axis, responsive to the introduction of said carrier into said supporting means for illuminating said selected patch;
   means, including a movable supplementary lens centerable on said optical axis between said reflective patch and said light sensor, responsive to the introduction of said carrier into said supporting means for causing the light reflected off of said selected patch to be focused onto said light sensor;
   means disposed on said printer for selectively positioning a transmissive filter between said selected patch and said light sensor; and
   a computer responsive to the output of said light sensor for calculating the reflective density of said selected patch.

* * * * *